UNITED STATES PATENT OFFICE.

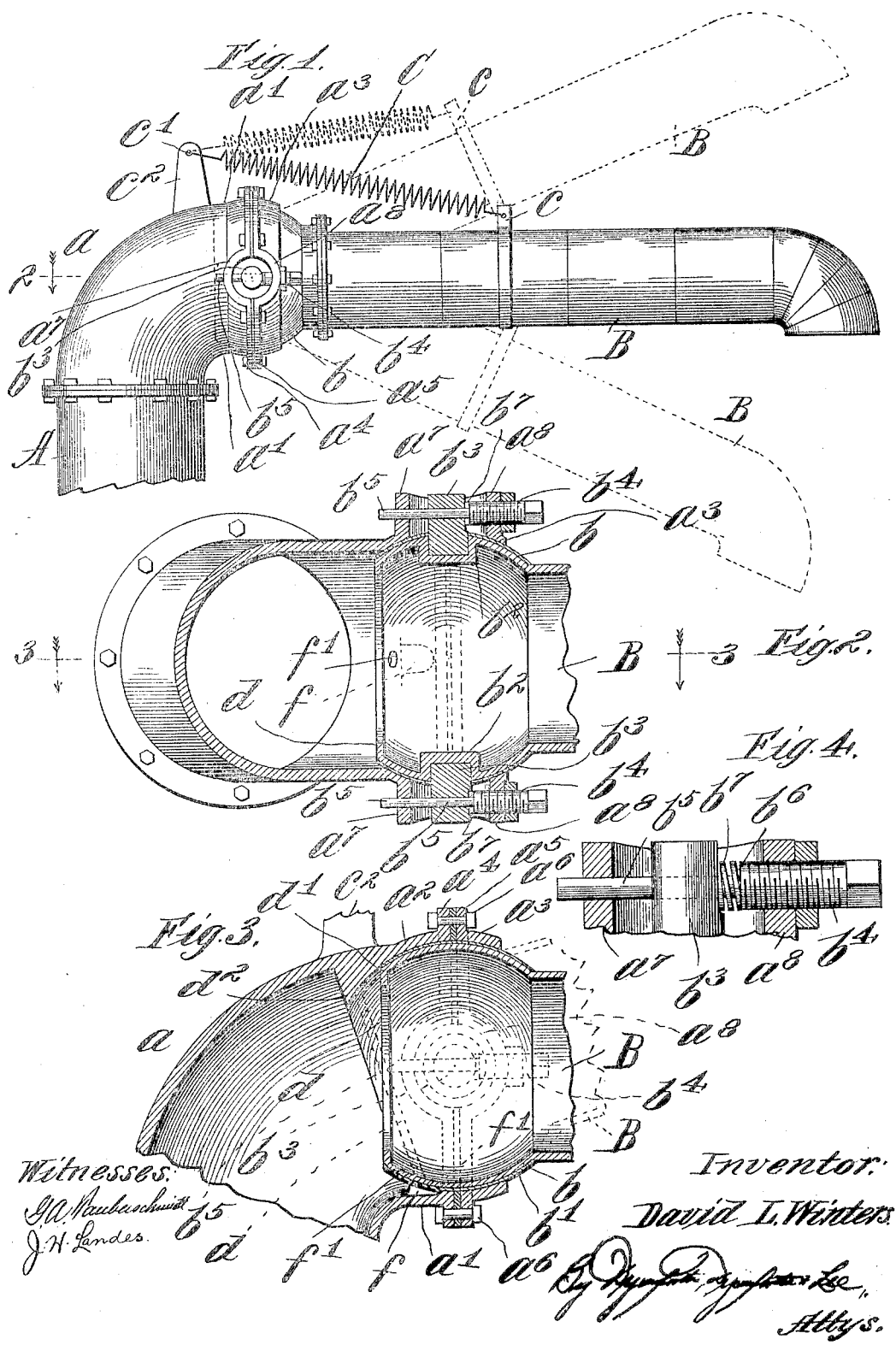

DAVID L. WINTERS, OF CHICAGO, ILLINOIS, ASSIGNOR OF ONE-HALF TO THEODORE W. SNOW, OF CHICAGO, ILLINOIS.

STAND-PIPE.

No. 804,511.  Specification of Letters Patent.  Patented Nov. 14, 1905.

Application filed March 11, 1905. Serial No. 249,573.

*To all whom it may concern:*

Be it known that I, DAVID L. WINTERS, a citizen of the United States, residing at Chicago, in the county of Cook and State of Illinois, have invented a new and useful Improvement in Stand-Pipes, of which the following is a specification.

My invention relates particularly to stand-pipes in which the horizontal arm is connected with the vertical standard by a ball-and-socket joint.

My primary object is to provide means for maintaining a close joint at the articulated connection between the horizontal arm and the vertical standard, and the several features of improvement herein disclosed have for their primary purpose the accomplishment of the result suggested, although, as will appear, certain other incidental advantages are inherent in my improved construction.

My invention is illustrated in its preferred embodiment in the accompanying drawings, in which—

Figure 1 represents a broken elevational view of a stand-pipe constructed in accordance with my improvements; Fig. 2, a broken section taken as indicated at line 2 of Fig. 1; Fig. 3, a broken section taken as indicated at line 3 of Fig. 2, and Fig. 4 an enlarged detail view of one of the journal-supports shown in Fig. 2.

In the construction shown, A represents the vertical water-column or standard of the stand-pipe, and B the vertically-swinging spout or horizontal member of the stand-pipe. The standard A is equipped with an elbow $a$, having a sectionally-constructed socket $a'$, the rear section $a^2$ of which constitutes a part of the elbow $a$ and the section $a^3$ of which is detachably joined to the section $a^2$. The socket-sections have the usual circumferential flanges $a^4 a^5$, connected by bolts $a^6$.

The rear or base end of the spout B is provided with a bearing $b$, constituting a portion of a hollow sphere, and the outer surface of this bearing is preferably covered by a shell $b'$, which may be of brass or Babbitt metal. At the lateral sides of the socket-sections $a^2 a^3$ the flanges $a^4 a^5$ are curved to form ring-sections $a^7 a^8$. The bearing $b$ fits within the socket $a'$ in the manner shown. Said bearing $b$ is provided at its lateral sides with internal bosses $b^2$, into which extend bores receiving journals $b^3$, whose outer ends are adjustable in the rings formed by the ring-sections $a^7 a^8$. Having threaded connection with the ring-sections $a^8$ are journal-adjusting bolts $b^4$, which have reduced sections $b^5$, extending through perforations in the outer ends of the journal-pins $b^3$ and also extending through perforations in the ring-sections $a^7$. Confined between shoulders $b^6$ on the adjusting-bolts $b^4$ and flattened surfaces at the outer ends of the journals $b^3$ are springs $b^7$, whose function is to keep the rear half of the bearing $b$ pressed against the rear sections $a^2$ of the socket. The spout is held normally elevated somewhat above the horizontal in the position indicated by dotted lines in Fig. 1 by a spring C, having one end attached to the spout at a point $c$ at the upper side of the spout and having the other end attached at a point $c'$ to a lug $c^2$, supported on the top of the elbow $a$. It will be noted that the spring C serves not only to maintain the spout in its elevated position when the spout is not in use, but also serves to draw the rear portion of the bearing $b$ firmly against the rear portion of the socket $a'$, thereby maintaining a close joint. Moreover, while the spring C serves the purpose of holding the free end of the spout elevated the arrangement is such that when the spout is depressed by the operator the line of force of the spring approaches the center about which the spout swings, thereby tending to decrease the turning movement exerted by the spring on the spout tending to lift the spout. The importance of this feature lies in the fact that the weight of the operator is depended upon to depress the spout, so that an undue lifting force on the spout would be objectionable. Furthermore, it appears that the spring while serving to maintain the spout in its elevated position tends not only to produce a close joint, owing to the force which it exerts to keep the bearing $b$ in close contact with the section $a^2$ of the socket, but it also serves to prevent undue wear at one portion of the ball-and-socket joint, such as does occur where weights in the rear of the standard A and connected by arms with the spout B are employed to counterbalance the spout.

It obviously is desirable to prevent the spout B from turning in any degree about its horizontal axis, and this result is accomplished in a wholly satisfactory manner by the expedient of extending the adjusting-bolts $b^4$ through the journals $b^3$. Heretofore a plurality of adjusting-bolts have been employed for centering the journals, and owing to the difficulty of securing accurate adjustment by these means the spout B has been turned somewhat upon its horizontal axis, and the difficulty rising therefrom is aggravated by the strain exerted upon the spout during the escape of water therefrom. In the construction shown the bolts $b^4$ move parallel with the path of movement of the bearing $b$ in the operation of pressing the bearing $b$ closely into contact with the socket-section $a^2$, so that there is no possibility of the above-designated difficulty occurring during the adjustment.

Heretofore in the class of construction to which my invention pertains it has been customary to terminate the inner spherical surface of the socket-section $a^2$ flush with the plane of the rear portion $d$ of the bearing $b$, assuming the spout B to be in the horizontal position. (Shown in full lines in Fig. 3.) In such a construction it occurs that when the spout is in its elevated position the upper rear portion $d'$ of the bearing $b$ will project beyond the bearing in the socket-section $a^2$, enabling ice to form upon the projecting portion. The ice forms a wedge-shaped coating, which when the spout is lowered is apt to be forced between the bearings of the joint, thereby breaking down or injuring the joint. To overcome this difficulty, I extend the upper portion of the socket $a^2$ in the rear of the position occupied by the upper portion of the bearing $b$, thereby forming a triangular hood $d^2$, having a spherical inner surface which receives the upper rear portion of the bearing $b$ when the spout is elevated and which does not interfere objectionably with the flow of water through the joint. This hood is of sufficient size to insure housing of the upper rear portion of the bearing $b$ when the spout is in its uppermost position.

Another difficulty which is experienced in this class of construction rises from the formation of ice within the concavity at the lower portion of the bearing $b$. To overcome this difficulty, I provide a recess $f$ at the inner surface of the socket $a^2$ and make a perforation $f'$ in the shell constituting the bearing $b$, the perforation $f'$ registering with the front end of the recess $f$, as indicated by the dotted lines in Fig. 3, when the free end of the spout is elevated. This enables the water to drain from the joint.

It will be understood that changes in details of construction within the spirit of my invention may occur to those skilled in the art. Hence no undue limitation should be understood from the foregoing detailed description.

What I regard as new, and desire to secure by Letters Patent, is—

1. In a stand-pipe, the combination of a water-column equipped with a socket, a spout equipped with a convex bearing entered in said socket, journals for the spout, adjusting-screws supported on the vertical column and interlockingly connected with said journals, said adjusting-screws serving to aid in maintaining a close joint, and springs confined between said screws and journals, for the purpose set forth.

2. In a stand-pipe, the combination of a vertical column equipped with an elbow provided with a spherical socket having a removable section, a spout having a ball entered in said socket and equipped with lateral bearings, journals entered in said bearings and provided with perforations, and horizontal adjusting-screws connected with the removable section of said socket and having stems extending through the perforations in said journals, for the purpose set forth.

3. In a stand-pipe, the combination of a vertical column equipped with an elbow provided with a spherical socket having a recess at its rear lower portion, and a spout having a hollow ball entered in said socket and provided at its rear lower portion with a perforation adapted to register with said recess when the spout is in its elevated position, for the purpose set forth.

4. In a stand-pipe, the combination of a vertical column equipped with a spherical socket, and a spout equipped with a ball entered in said socket, said socket having at its upper rear portion an extension adapted to sheath the upper rear portion of said ball when the spout is in its elevated position, for the purpose set forth.

DAVID L. WINTERS.

In presence of—
J. H. LANDES,
W. B. DAVIES.